(12) United States Patent
Mayer et al.

(10) Patent No.: US 8,549,327 B2
(45) Date of Patent: Oct. 1, 2013

(54) BACKGROUND SERVICE PROCESS FOR LOCAL COLLECTION OF DATA IN AN ELECTRONIC DISCOVERY SYSTEM

(75) Inventors: Michael J. Mayer, Charlotte, NC (US);
Emerson D. Miller, Charlotte, NC (US);
David M. Andersen, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 519 days.

(21) Appl. No.: 12/731,657

(22) Filed: Mar. 25, 2010

(65) Prior Publication Data

US 2010/0185875 A1    Jul. 22, 2010

Related U.S. Application Data

(63) Continuation-in-part of application No. 12/259,080, filed on Oct. 27, 2008, now Pat. No. 8,321,860.

(60) Provisional application No. 61/164,276, filed on Mar. 27, 2009.

(51) Int. Cl.
*G06F 12/14* (2006.01)

(52) U.S. Cl.
USPC ........... 713/193; 711/161; 711/162; 707/640; 726/19

(58) Field of Classification Search
USPC .................................................. 711/161, 162
See application file for complete search history.

(56) References Cited

U.S. PATENT DOCUMENTS

| 5,604,862 | A | * | 2/1997 | Midgely et al. ................. 714/6.1 |
| 6,119,137 | A | | 9/2000 | Smith et al. |
| 6,601,108 | B1 | | 7/2003 | Marmor |
| 6,658,625 | B1 | | 12/2003 | Allen |
| 6,829,617 | B2 | * | 12/2004 | Sawdon et al. ........................ 1/1 |

(Continued)

FOREIGN PATENT DOCUMENTS

| EP | 1093068 A2 | 4/2001 |
| EP | 1349089 A2 | 1/2003 |

(Continued)

OTHER PUBLICATIONS

HP OpenView Storage Data Protector Concepts Guide, Hewlett-Packard Development Company, L.P. (Published Jul. 2006), retrieved from http://h20000.www2.hp.com/bc/docs/support/SupportManual/c00751562/c00751562.pdf, on Jan. 27, 2012.*

(Continued)

*Primary Examiner* — Don Wong
*Assistant Examiner* — Theodore Hebert
(74) *Attorney, Agent, or Firm* — Michael A. Springs; Moore & Van Allen, PLLC; James C. Edwards

(57) ABSTRACT

Embodiments of the invention relate to systems, methods, and computer program products for a local collection tool that is configured to run as an authorized background service process. As such, the local collection tool of the present invention is capable of being executed in the absence of the device user's credentials. As a result, local collection can be accomplished without the user being present or covertly without the user's knowledge of collection process. Moreover, the back-up file generated by the collection tool may include encrypted data, which can automatically be decrypted by the collection entity through application of a master key.

18 Claims, 5 Drawing Sheets

(56) References Cited

U.S. PATENT DOCUMENTS

| | | | |
|---|---|---|---|
| 6,941,361 B1 | 9/2005 | Fink et al. | |
| 7,069,401 B1* | 6/2006 | Noonan et al. | 711/162 |
| 7,076,543 B1* | 7/2006 | Kirti et al. | 709/223 |
| 7,124,249 B1 | 10/2006 | Darcy | |
| 7,134,020 B2 | 11/2006 | Eagle et al. | |
| 7,376,969 B1 | 5/2008 | Njemanze et al. | |
| 7,451,103 B1 | 11/2008 | Boyle et al. | |
| 7,451,139 B2 | 11/2008 | Namba | |
| 7,765,181 B2 | 7/2010 | Thomas et al. | |
| 7,797,752 B1* | 9/2010 | Vaidya et al. | 726/27 |
| 7,895,229 B1 | 2/2011 | Paknad | |
| 8,073,729 B2 | 12/2011 | Kisin et al. | |
| 8,086,694 B2* | 12/2011 | Andersen et al. | 709/217 |
| 2002/0194097 A1 | 12/2002 | Reitz | |
| 2002/0198629 A1 | 12/2002 | Ellis | |
| 2003/0154199 A1 | 8/2003 | Thomas et al. | |
| 2003/0182375 A1 | 9/2003 | Zhu et al. | |
| 2003/0200308 A1 | 10/2003 | Tameda et al. | |
| 2004/0075677 A1* | 4/2004 | Loyall et al. | 345/706 |
| 2004/0098424 A1 | 5/2004 | Seidenberg et al. | |
| 2004/0260733 A1 | 12/2004 | Adelstein et al. | |
| 2005/0086720 A1 | 4/2005 | Shimizu et al. | |
| 2005/0152235 A1 | 7/2005 | Hoshizawa | |
| 2005/0177527 A1 | 8/2005 | Morris et al. | |
| 2005/0216788 A1* | 9/2005 | Mani-Meitav et al. | 714/6 |
| 2006/0036676 A1* | 2/2006 | Cardone et al. | 709/203 |
| 2006/0095795 A1* | 5/2006 | Nakamura et al. | 713/193 |
| 2006/0167877 A1 | 7/2006 | Lee et al. | |
| 2006/0218346 A1* | 9/2006 | Nagumo et al. | 711/114 |
| 2006/0256739 A1 | 11/2006 | Seier et al. | |
| 2006/0259725 A1* | 11/2006 | Saika et al. | 711/162 |
| 2007/0005914 A1* | 1/2007 | Thompson et al. | 711/162 |
| 2007/0027974 A1 | 2/2007 | Lee et al. | |
| 2007/0073894 A1 | 3/2007 | Erickson et al. | |
| 2007/0088754 A1 | 4/2007 | Brannon et al. | |
| 2007/0112783 A1* | 5/2007 | McCreight et al. | 707/10 |
| 2007/0162547 A1 | 7/2007 | Ross | |
| 2007/0169078 A1* | 7/2007 | Li | 717/168 |
| 2007/0185938 A1* | 8/2007 | Prahlad et al. | 707/204 |
| 2007/0204104 A1* | 8/2007 | Wan et al. | 711/114 |
| 2007/0208918 A1 | 9/2007 | Harbin et al. | |
| 2007/0226170 A1 | 9/2007 | Sun | |
| 2007/0271517 A1 | 11/2007 | Finkelman et al. | |
| 2007/0288579 A1 | 12/2007 | Schunemann | |
| 2008/0027895 A1 | 1/2008 | Combaz | |
| 2008/0046260 A1* | 2/2008 | Ghielmetti et al. | 705/1 |
| 2008/0061146 A1 | 3/2008 | Komaki | |
| 2008/0082672 A1 | 4/2008 | Garrett | |
| 2008/0168145 A1 | 7/2008 | Wilson | |
| 2008/0229037 A1* | 9/2008 | Bunte et al. | 711/162 |
| 2008/0252936 A1 | 10/2008 | Stratton | |
| 2008/0263007 A1* | 10/2008 | Schmidt | 707/3 |
| 2008/0288479 A1 | 11/2008 | Paknad et al. | |
| 2008/0294492 A1 | 11/2008 | Simpson et al. | |
| 2009/0001162 A1 | 1/2009 | Asher et al. | |
| 2009/0006973 A1 | 1/2009 | Newell et al. | |
| 2009/0043819 A1 | 2/2009 | Searl et al. | |
| 2009/0083375 A1* | 3/2009 | Chong et al. | 709/203 |
| 2009/0132262 A1 | 5/2009 | Paknad | |
| 2009/0164522 A1 | 6/2009 | Fahey | |
| 2009/0165026 A1 | 6/2009 | Paknad et al. | |
| 2009/0183253 A1 | 7/2009 | Kates | |
| 2009/0286219 A1 | 11/2009 | Kisin et al. | |
| 2009/0307333 A1* | 12/2009 | Welingkar et al. | 709/219 |
| 2010/0017239 A1 | 1/2010 | Saltzman et al. | |
| 2010/0033750 A1 | 2/2010 | Tischler et al. | |
| 2010/0077160 A1* | 3/2010 | Liu et al. | 711/162 |
| 2010/0082382 A1 | 4/2010 | Kisin et al. | |
| 2010/0082555 A1 | 4/2010 | Ogawa et al. | |
| 2010/0185875 A1* | 7/2010 | Mayer et al. | 713/189 |
| 2010/0205020 A1 | 8/2010 | Losey | |
| 2010/0223108 A1 | 9/2010 | Quinn, Jr. | |
| 2011/0040600 A1 | 2/2011 | Paknad et al. | |
| 2011/0173033 A1 | 7/2011 | Paknad et al. | |

FOREIGN PATENT DOCUMENTS

| | | | |
|---|---|---|---|
| WO | 01/27765 A1 | 4/2001 | |
| WO | 0210967 A2 | 2/2002 | |
| WO | 02071192 A2 | 9/2002 | |
| WO | 03/065256 A1 | 8/2003 | |
| WO | 2004092902 A2 | 10/2004 | |
| WO | 2006001833 A2 | 1/2006 | |
| WO | 2006031836 A2 | 3/2006 | |
| WO | WO 2006/031836 A2 | 3/2006 | |
| WO | 2006052441 A2 | 5/2006 | |
| WO | 2007/044709 A2 | 4/2007 | |
| WO | 2007076515 A2 | 7/2007 | |
| WO | WO 2007/076515 | 7/2007 | |
| WO | 2008009991 A1 | 1/2008 | |
| WO | 2008070415 A2 | 6/2008 | |
| WO | WO 2008/070415 A2 | 6/2008 | |

OTHER PUBLICATIONS

HP OpenView Storage Data Protector 5.5 Microsoft Windows Server 2003 Cluster Server integration, Hewlett-Packard Development Company, L.P. (Published Jul. 2003), retrieved from http://h20000.www2.hp.com/bc/docs/support/SupportManual/c00669082/c00669082.pdf on Apr. 5, 2013.*

Lotus Inside Notes, Lotus Development Corporation (Published 2000), retrieved from http://www-12.lotus.com/ldd/doc/uafiles.nsf/docs/inside-notes/$File/insidenotes.pdf, on Oct. 3, 2012.*

J. Barlow, L. Bean and D.D. Hott: "Employee 'Spy' Software: Should You Use It?" The Journal of Corporate Accounting & Finance, Document No. XP-002601405, pp. 7-12; Retrieved from the Internet: URL: http://onlinelibrary.wiley.com/10.1002/jcaf.10162/abstract [retrieved on Sep. 17, 2010]

Dan Manson et al.: "Is the Open Way a Better Way? Digital Forensics using Open Source Tools", Proceedings of the 40$^{th}$ Hawaii International Conference on System Sciences-2007 [dated Jan. 1, 2007]; 10 pages total.

Anonymous: "EDRM LegalTech 2009 Luncheon Presentation", E.D.R.M.—The Electronic Discovery Reference Model; Document No. XP-002601404 Legal Tech Lunch & Learn, Feb. 3, 2009, LegalTech New York; Retrieved from the Internet: URL: http://edrm.net/002/wp-content/uploads/2009/09/EDRM_LegalTech.pdf [retrieved Sep. 17, 2010].

Extended European Search Report dated Sep. 23, 2010 for European Application No. EP 10 25 0582.

Singapore Patent Application No. 201002142-6 Search Report and Written Opinion mailed Sep. 5, 2011.

Singapore Patent Application No. 201002144-2 Search Report and Written Opinion mailed Sep. 5, 2011.

Singapore Patent Application No. 201002140-0 Search Report and Written Opinion mailed Sep. 27, 2011.

SysTools Software, "Export Notes—Notes Email Migration Tool", 2008, available online: http://web.archive.org/web/20080201104418/http://www.exportlotusnotes.com/export-notes.

Process Text Group, "ABC Amber BlackBerry Converter", 2008, available online: http://web.archive.org/web/20080302025411/http://www.processtext.com/abcblackberry.html.

Search Report and Written Opinion for Singapore Application No. 201002122-8 mailed Jan. 3, 2012.

Search Report and Written Opinion for Singapore Application No. 201002141-8 mailed Jan. 3, 2012.

Search Report and Written Opinion for Singapore Application No. 201002143-4 mailed Jan. 3, 2012.

Search Report and Written Opinion for Singapore Application No. 201002120-2 mailed Feb. 10, 2012.

Second Written Opinion for Singapore Application No. 201002126-9 mailed Mar. 14, 2012.

Second Written Opinion for Singapore Application No. 201002128-5 mailed Mar. 14, 2012.

Second Written Opinion for Singapore Application No. 201002129-3 mailed Mar. 14, 2012.

Second Written Opinion for Singapore Application No. 201002139-2 mailed Mar. 14, 2012.

Ciravegna et al.: "User-System Cooperation in Document Annotation based on Information Extraction" 2002. Proceedings of the 13th International Conference on Knowledge Engineering and Knowledge Management.
Buchholz et al.: "On the Role of File System Metadata in Digital Forensics", Journal of Digital Investigation, vol. 1(4), pp. 297-308, Dec. 1, 2004.
Golden et al. Scalpel: "A Frugal, High Performance File Carver" 2005 Digital Forensic Research Workshop (DFRWS) New Orleans, LA.
Manson et al.: "Is the Open Way a Better Way? Digital Forensics using Open Source Tools". System Sciences, 2007. HICSS 2007. 40th Annual Hawaii International Conference on, IEEE, PI, Jan. 1, 2007. ISBN:978-0-7695-2755-0.
Berinato: "The Rise of Anti-Forensics" http/www.csoonline.com/article/print/221208. Jun. 8, 2007.
Anonymous: "EDRM LegalTech 2009 Luncheon Presentation" E.D.R.M. The Electronic Discovery Reference Model Feb. 9, 2009. Retrieved from the Internet: http://www.edrm.net/wp-content/plugins/download-monitor/download.php?id=6.
Singapore Patent Application No. 201002126-9 Search Report and Written Opinion mailed Aug. 3, 2011.
Singapore Patent Application No. 201002129-3 Search Report and Written Opinion mailed Aug. 3, 2011.
Singapore Patent Application No. 201002128-5 Search Report and Written Opinion mailed Aug. 3, 2011.
Singapore Patent Application No. 201002139-2 Search Report and Written Opinion mailed Aug. 3, 2011.
Singapore Patent Application No. 201002137-6 Search Report and Written Opinion mailed Aug. 15, 2011.
Singapore Patent Application No. 201002138-4 Search Report and Written Opinion mailed Aug. 19, 2011.
Singapore Patent Application No. 201002125-1 Search Report and Written Opinion mailed Aug. 24, 2011.
Singapore Patent Application No. 201002134-3 Search Report and Written Opinion mailed Aug. 25, 2011.
Singapore Patent Application No. 201002124-4 Search Report and Written Opinion mailed Aug. 25, 2011.
Utility U.S. Appl. No. 12/534,375, filed Aug. 3, 2009.
Utility U.S. Appl. No. 12/614,059, filed Nov. 6, 2009.
Utility U.S. Appl. No. 12/618,430, filed Nov. 13, 2009.
Utility U.S. Appl. No. 12/618,443, filed Nov. 13, 2009.
Utility U.S. Appl. No. 12/627,791, filed Nov. 30, 2009.
Utility U.S. Appl. No. 12/627,890, filed Nov. 30, 2009.
Utility U.S. Appl. No. 12/627,996, filed Nov. 30, 2009.
Utility U.S. Appl. No. 12/696,653, filed Jan. 29, 2010.
Utility U.S. Appl. No. 12/702,641, filed Feb. 9, 2010.
Utility U.S. Appl. No. 12/729,987, filed Mar. 23, 2010.
Utility U.S. Appl. No. 12/730,780, filed Mar. 24, 2010.
Utility U.S. Appl. No. 12/730,785, filed Mar. 24, 2010.
Utility U.S. Appl. No. 12/730,790, filed Mar. 24, 2010.
Utility U.S. Appl. No. 12/730,792, filed Mar. 24, 2010.
Utility U.S. Appl. No. 12/730,799, filed Mar. 24, 2010.
Utility U.S. Appl. No. 12/730,807, filed Mar. 24, 2010.
Utility U.S. Appl. No. 12/730,818, filed Mar. 24, 2010.
Utility U.S. Appl. No. 12/730,821, filed Mar. 24, 2010.
Utility U.S. Appl. No. 12/730,840, filed Mar. 24, 2010.
Utility U.S. Appl. No. 12/730,848, filed Mar. 24, 2010.
Utility U.S. Appl. No. 12/730,851, filed Mar. 24, 2010.
European Patent Office. European Office Action dated Apr. 26, 2012. European Application No. 10 250 585.6. Name of Applicant: Bank of America Corporation. English Language. 10 pages.
European Patent Office. European Office Action dated Apr. 26, 2012. European Application No. 10 250 589.8. Name of Applicant: Bank of America Corporation. English Language. 10 pages.
European Patent Office. European Office Action dated Apr. 26, 2012. European Application No. 10 250 579.9. Name of Applicant: Bank of America Corporation. English Language. 10 pages.
European Patent Office. European Office Action dated Apr. 26, 2012. European Application No. 10 250 584.9. Name of Applicant: Bank of America Corporation. English Language. 10 pages.
European Patent Office. European Office Action dated Apr. 25, 2012. European Application No. 10 250 586.4. Name of Applicant: Bank of America Corporation. English Language. 10 pages.
European Patent Office. European Office Action dated Apr. 25, 2012. European Application No. 10 250 581.5. Name of Applicant: Bank of America Corporation. English Language. 10 pages.
European Patent Office. European Office Action dated Apr. 25, 2012. European Application No. 10 250 576.5. Name of Applicant: Bank of America Corporation. English Language. 11 pages.
European Patent Office. European Office Action dated Apr. 27, 2012. European Application No. 10 250 587.2. Name of Applicant: Bank of America Corporation. English Language. 10 pages.
European Patent Office. European Office Action dated Apr. 25, 2012. European Application No. 10 250 577.3. Name of Applicant: Bank of America Corporation. English Language. 10 pages.
European Patent Office. European Office Action dated Apr. 25, 2012. European Application No. 10 250 580.7. Name of Applicant: Bank of America Corporation. English Language. 10 pages.
European Patent Office. European Office Action dated Apr. 25, 2012. European Application No. 10 250 590.6. Name of Applicant: Bank of America Corporation. English Language. 10 pages.
European Patent Office. European Office Action dated Apr. 26, 2012. European Application No. 10 250 582.3. Name of Applicant: Bank of America Corporation. English Language. 10 pages.
Great Britain Intellectual Property Office. GB Examination Report dated Apr. 23, 2012. Great Britain Application No. GB1108090.0. Name of Applicant: Bank of America Corporation. English Language. 3 pages.
Hewlett Packard. *"HP OpenView Storage Data Protector Concepts Guide."* Release A.06.00. Manufacturing Part No. B6960-96001. English Language. Jul. 2006.
Hungarian Intellectual Property Office. Written Opinion mailed Apr. 5, 2012. Hungary Application No. 201002137-6. Name of Applicant: Bank of America Corporation. English Language. 8 pages. Date of Written Opinion: Mar. 21, 2012.
Hungarian Intellectual Property Office. Written Opinion mailed Apr. 5, 2012. Hungary Application No. 201002138-4. Name of Applicant: Bank of America Corporation. English Language. 8 pages. Date of Written Opinion: Mar. 29, 2012.
European Patent Office. European Office Action dated Apr. 26, 2012. European Application No. 10 250 583.1. Name of Applicant: Bank of America Corporation. English Language. 10 pages.
Examination Report for European Application No. 10250588.0 dated Jun. 27, 2012.
Second Written Opinion for Singapore Application No. 201002120-2 dated Jul. 20, 2012.
Second Written Opinion for Singapore Application No. 201002141-8 dated Jul. 20, 2012.
Second Written Opinion for Singapore Application No. 201002140-2 dated Aug. 6, 2012.
Second Written Opinion for Singapore Application No. 201002144-2 dated Aug. 6, 2012.
Danish Patent and Trademark Office. Singapore Examination Report mailed Mar. 15, 2012. Applicant: Bank of America Corporation. Singapore Patent Application No. 201002134-3. DKPTO SE No. SE 2012 00392v. English Language. 10 pages. Date of Examination Report: Mar. 12, 2012.
Danish Patent and Trademark Office. Singapore Examination Report mailed Mar. 15, 2012. Applicant: Bank of America Corporation. Singapore Patent Application No. 201002124-4. DKPTO SE No. SE 2012 00392y. English Language. 10 pages. Date of Examination Report: Mar. 12, 2012.
European Patent Office. European Office Action dated Apr. 25, 2012. European Application No. 10 250 578.1. Name of Applicant: Bank of America Corporation. English Language. 10 pages.
European Patent Office. European Office Action dated Apr. 25, 2012. European Application No. 10 250 591.4. Name of Applicant: Bank of America Corporation. English Language. 10 pages.

* cited by examiner

BACKGROUND SERVICE PROCESS FOR LOCAL COLLECTION OF DATA IN AN ELECTRONIC DISCOVERY SYSTEM

CLAIM OF PRIORITY UNDER 35 U.S.C. §119

The present Application for Patent claims priority to Provisional Application No. 61/164,276 entitled "Electronic Discovery System" filed Mar. 27, 2009, and assigned to the assignee hereof and hereby expressly incorporated by reference herein.

CROSS-REFERENCE TO RELATED APPLICATION

This application is a continuation-in-part of co-pending patent application Ser. No. 12/259,080, filed Oct. 27, 2008, entitled "Local Collector", assigned to the same inventive entity; the entire disclosure of which is incorporated herein by reference.

FIELD

In general, embodiments of the invention relate to methods, systems, apparatus and computer program products for electronic discovery and, more particularly, remotely collecting data from the local storage of computing device by execution of a collection tool that runs as an authorized background service process.

BACKGROUND

Companies conducting litigation face exhaustive legal discovery requests that require the collection of substantial amounts of electronic data, including user-created and/or user-modified files located on the hard drives of their employees' computers. Collecting this data is a time-consuming and labor intensive process that disrupts the employees' workday and often inconveniences those managing the collection process. Current methods require that the employee herself, or another individual on behalf of the employee, be responsible for the collection process by running certain software on the employee's computer. Because the employee will necessarily have notice of the collection, and indeed will determine when to begin the collection, the possibility exists that the employee could alter or delete the files on the computer before beginning the collection process, a practice which requires controls to reduce its frequency of occurrence.

In terms of the actual collection process, current solutions, once installed and initialized by the employee, copy files directly from the computer's local storage, uploading the resulting copies to a server to be compiled in anticipation of responding to the discovery request. During the period of copying and uploading, which can be several hours or more, the files being copied are unavailable to the employee and the processing capability of the computer and the available bandwidth are materially degraded, rendering the computer virtually unusable during the collection process. Files may also become corrupted if they are modified, opened or otherwise used while they are being collected. This period of inability to use the computer and its files not only leads to lost productivity of the employee, it also creates an obstacle for the discovery management personnel attempting to persuade employees to run the software and collect the files on their computers.

In addition, collections that are attempted over virtual private networks are inherently unreliable when using these known tools. If the network connection is interrupted, the entire process must often be restarted, adding to even greater periods of lost employee productivity. In conclusion, it is apparent that the commercial products utilized by many companies today and other known electronic discovery solutions are ill-equipped to adapt to an employee's work requirements, avoid destruction and/or corruption of discoverable data, handle interruptions, whether caused by the employee or by outages of connectivity, and operate remotely within a defined network. Therefore, there is a need for an electronic discovery system and tool that retains greater control over the collection process by operating remotely at the discretion of a manager, minimizes disruption of an employee's workday, and allows an employee to retain substantial use of her computer during collection.

Moreover, current collections mechanisms are deployed as conventional applications. As such, the user of the computing device from which collection id to occur is required to enter their credentials, such as username and passcode, to log-on to the computing device as a means of initiating the data collection application. This means that the electronic discovery/data collection entity may not or may have difficulty collecting the data from the computing device if the user is no longer available, due to termination, resignation, or the like. In addition, the electronic discovery/data collection entity is unable to covertly collect the data, unbeknownst to the device user, as required for certain collections, such as investigations or the like. Therefore, a need exists to develop apparatus, systems, computer program products and the like that provide for collection of data stored locally without the intervention or availability of the device user.

SUMMARY

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention relate to systems, apparatus, methods, and computer program products for a local collection tool that is configured to run as an authorized background service process as opposed to a conventional application. As such, the local collection tool of the present invention is capable of being executed in the absence of the device user's credentials. Moreover, the authorized background service process aspect of the present invention provides for bypassing file security thereby providing access to files that even the device user may not have access to.

In addition, due to the fact that the local collector is configured to be executed without the user providing credentials, the back-up file that is generated by the collection tool may include encrypted data. Thus, according to specific embodiments of the invention the collection entity, such as a collection server or the like, is configured to automatically decrypt the encrypted data using a master key. Use of a master key eliminates the need to manually enter the user's key to provide for decryption of the encrypted data.

A method for collecting locally stored data in an electronic discovery system provides for embodiments of the present invention. The method includes executing, via a computing device processor, a collection tool at a computing device within the electronic discovery system. The collection tool is configured to run as an authorized background service process. The method further includes generating, via the computing device processor, in response to execution of the collection tool, a backup file that includes data stored locally at the computing device and communicating, from the computing device to a collection server, the backup file.

In specific embodiments of the method, executing further comprises executing, via the computing device processor, the collection tool configured to run absent computer device-user credentials and/or to bypass data access security for collection of data.

In other specific embodiments of the method generating further comprises generating a backup file that includes encrypted data stored locally at the computing device. In such embodiments of the method, communicating further comprises communicating, from the computing device to the collection server, the back-up file, wherein decryption of the encrypted data within the backup files occurs at the collection server and, in some embodiments, by automated application of a master key.

An apparatus configured for electronic discovery collection of locally stored data defines another embodiment of the invention. The apparatus includes a computing platform including a memory and a processor. The apparatus further includes a collection tool stored in the memory, executable by the processor as an authorized background service process and configured to generate a backup file that includes data stored locally at the computing device and communicate the backup file to a collection server.

In specific embodiments of the apparatus, the collection tool is further configured to be automatically executable by the processor absent computer device-user credentials. In other specific embodiments of the apparatus, the collection tool is further configured to generate the backup file of data by bypassing data access security.

In further specific embodiments of the apparatus, the collection tool is further configured to generate a backup file that includes encrypted data stored locally at the computing device. In such embodiments, the collection tool is further configured communicate the back-up file to the collection server, wherein decryption of the encrypted data within the backup files occurs at the collection server and, in some embodiments, by automated application of a master key.

A computer program product including a computer-readable medium provides yet another embodiment of the invention. The computer-readable medium includes a first set of codes for causing a computer to execute a collection tool. The collection tool is configured to run as an authorized background service process. The computer-readable medium additionally includes a second set of codes for causing a computer to generate, in response to execution of the collection tool, a backup file that includes data stored locally. Further, the computer-readable medium includes a third set of codes for causing a computer to communicate the backup file to a collection server.

In specific embodiments of the computer program product the first set of codes is further configured to execute the collection tool absent computer device-user credentials and/or execute the collection tool to bypass data access security.

In further specific embodiments of the computer program product, the second set of codes is further configured to cause the computer to generate the backup file that includes encrypted data stored locally. In such embodiments, the third set of codes is further configured to cause the computer to communicate the back-up file to the collection server, wherein decryption of the encrypted data within the backup files occurs at the collection server and, in specific embodiments, by automated application of a master key.

Another method for collecting data locally stored in an electronic discovery system provides for further embodiments of the invention. The method includes communicating, via a computing device processor, a collection tool to a computing device within the electronic discovery system, wherein the collection tool is configured to run as an authorized background service process. The method further includes receiving, at a collection server, in response to communication of the collection tool, a backup file that includes data stored locally at the computing device.

In specific embodiments of the method, receiving further comprises receiving, at the collection server, the backup file that includes encrypted data locally stored at the computing device. In such embodiments, the method further includes decrypting, at the collection server, the encrypted data in the backup file an, in certain embodiments, decrypting by automatic application of a master key.

In other specific embodiment of the method, communicating further comprises communicating the collection tool, wherein the collection tool is configured to run absent computer device-user credentials and/or configured to bypass data access security for collection of data.

An apparatus for deploying a collection tool and receiving locally collected data defines yet another embodiment of the invention. The apparatus includes a computing platform including memory and one or more processors. The apparatus further includes a collection tool deployment application stored in the memory, executable by one of the processors and configured to communicate a collection tool to a computing device within the electronic discovery system. The collection tool is configured to run as an authorized background service process. Further, the apparatus includes a data collection application stored in the memory, executable by one of the processors and configured to receiving, in response to communication of the collection tool, a backup file that includes data stored locally at the computing device.

In specific embodiments of the apparatus, the data collection application is further configured to receive the backup file that includes encrypted data locally stored at the computing device. In such embodiments, the data collection application further comprises a decryption routine configured to decrypt the encrypted data in the backup file and, in specific embodiments, by automatic application of a master key.

A computer program product including a computer-readable medium provides for another embodiment of the invention. The computer-readable medium includes a first set of codes for causing a computer to communicate a collection tool to a computing device within the electronic discovery system. The collection tool is configured to run as an authorized background service process. The computer-readable medium further includes a second set of codes for causing a computer to receive, in response to communication of the collection tool, a backup file that includes data stored locally at the computing device.

In specific embodiments of the computer program product, the second set of codes is further configured to receive the backup file that includes encrypted data locally stored at the computing device. In such embodiments, the computer-readable medium includes a third set of codes for causing a computer to decrypt the encrypted data in the backup file and, in some embodiments, decrypt by automatic application of a master key.

In further specific embodiments of the computer program product, the first set of codes is further configured to cause the computer to communicate the collection tool, wherein the collection tool is configured to run absent computer device-user credentials and/or configured to bypass data access security for collection of data.

Thus, as described in greater detail below, present embodiments of the invention provide for a local collection tool that is configured to run as an authorized background service process. As such, the local collection tool of the present invention is capable of being executed in the absence of the device user's credentials. As a result, local collection can be accomplished without the user being present or covertly without the user's knowledge of collection process.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
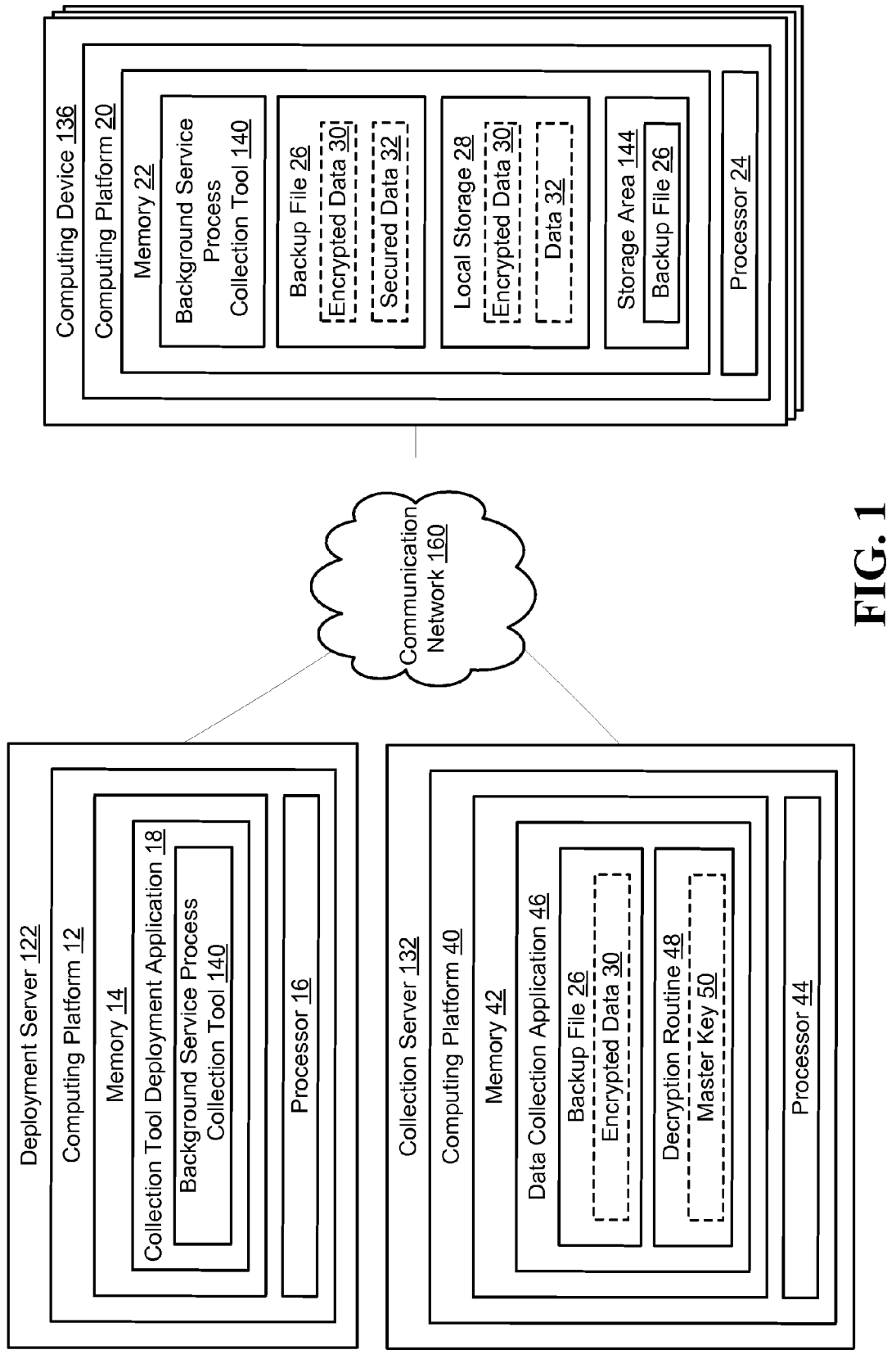
Figure 2:
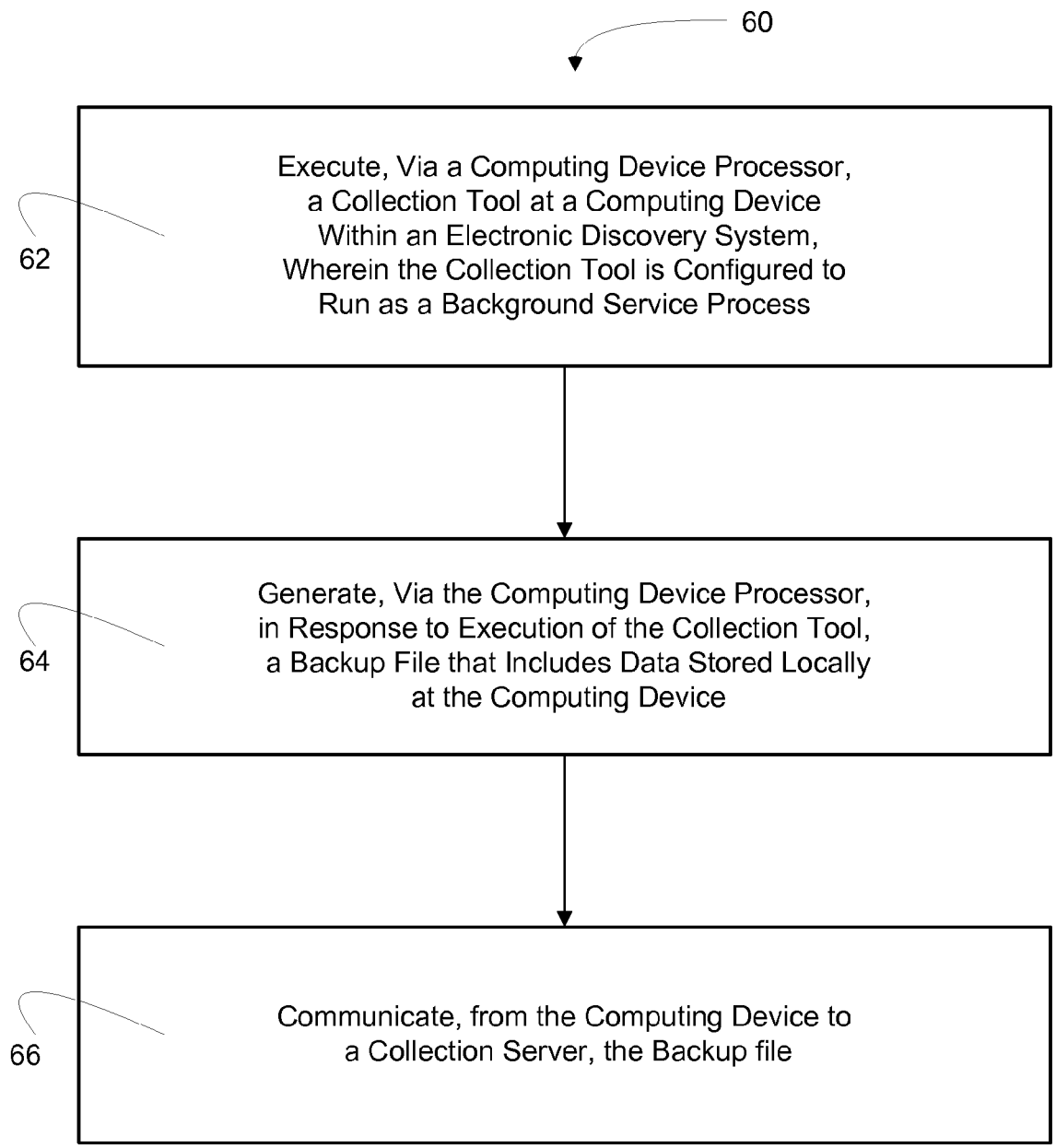
Figure 3:
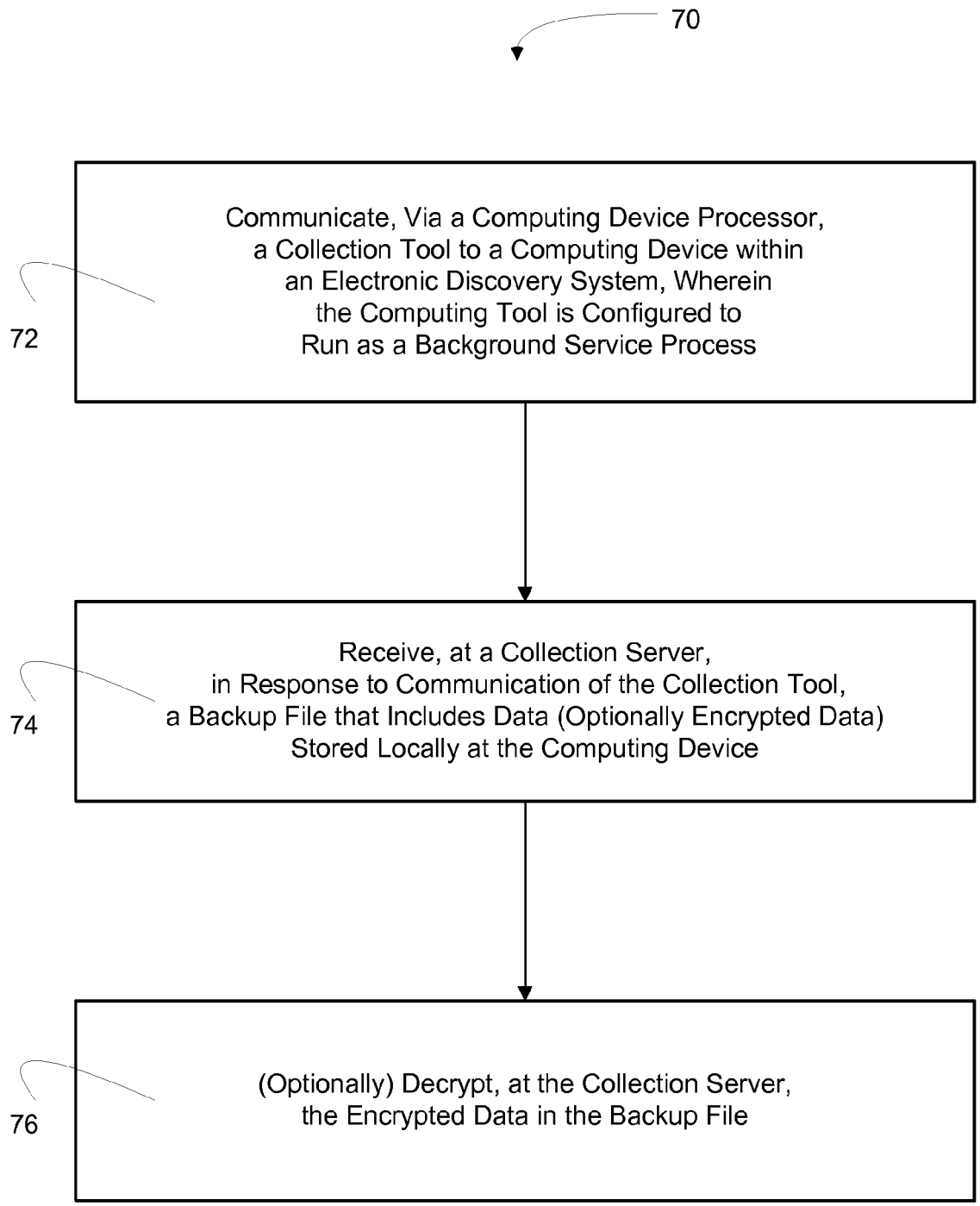
Figure 4:
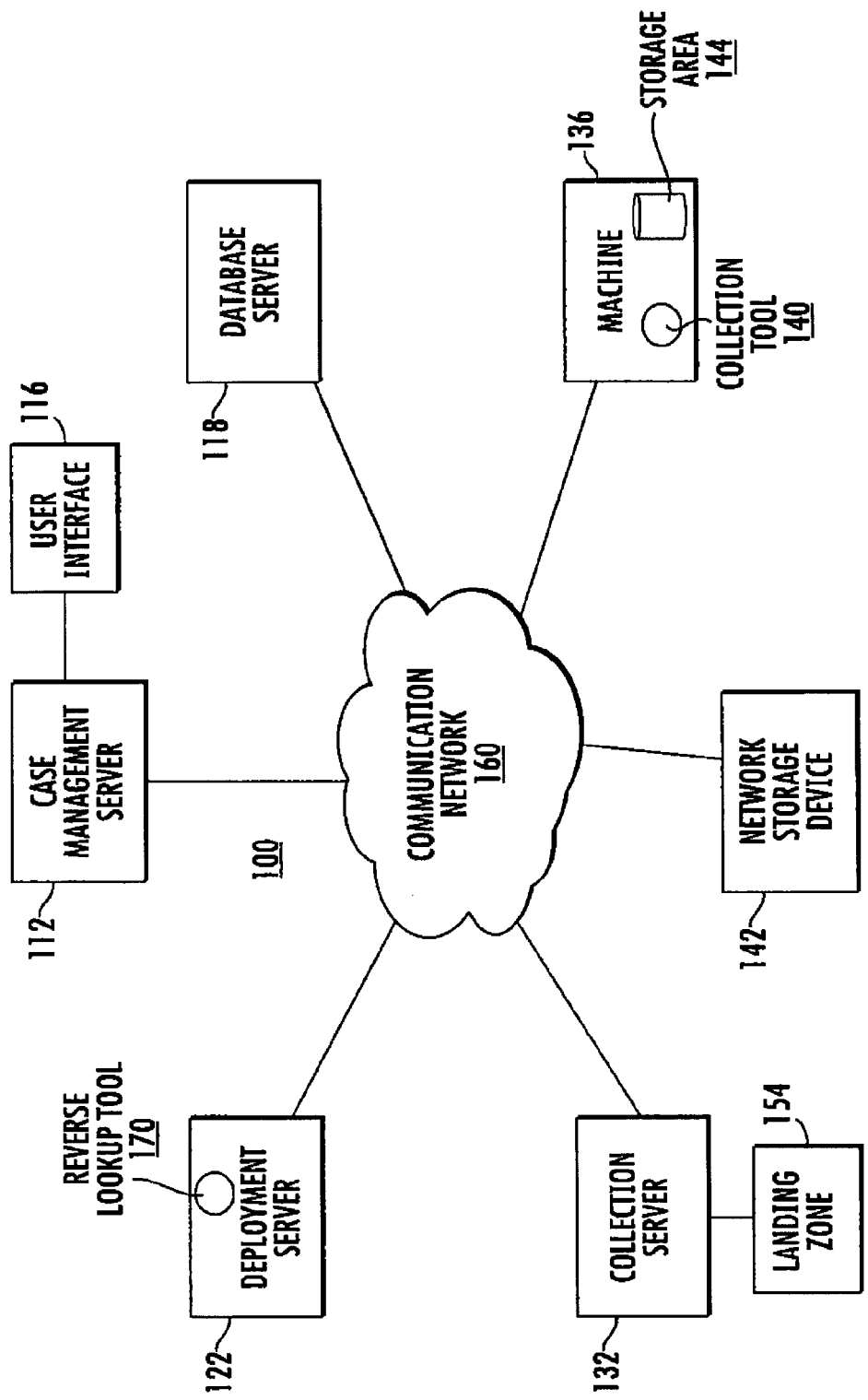
Figure 5:
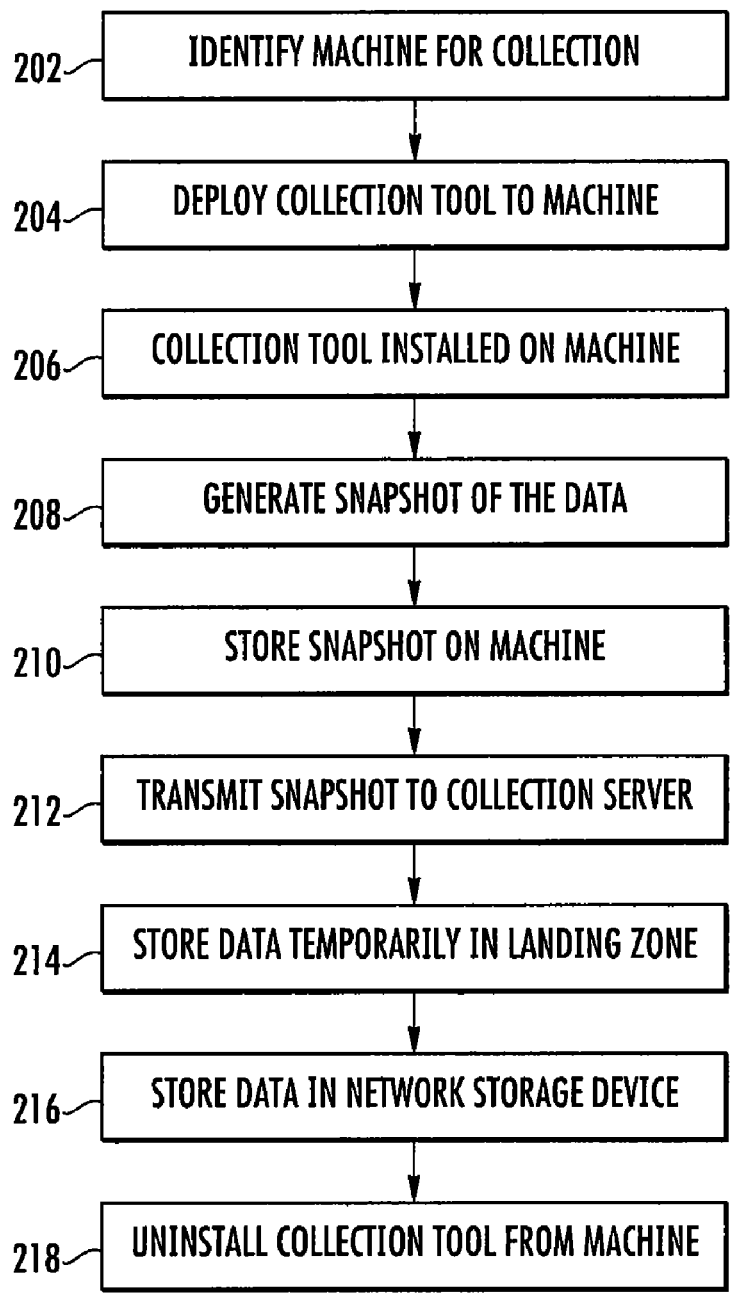

Having thus described embodiments of the invention in general terms, reference will now be made to the accompanying drawings, which are not necessarily drawn to scale, and wherein:

FIG. 1 is a schematic diagram of a system for local data collection in an electronic discovery system, in which the local collector tool is executed as an authorized background service process, in accordance with embodiments of the present invention;

FIG. 2 is a flow diagram of a method for executing a local collection tool that runs as an authorized background service process, in accordance with embodiments of the present invention;

FIG. 3 is a flow diagram of a method for deploying a local collection tool that runs as an authorized background service process and receiving the backup file resulting from running such a collection tool, in accordance with embodiments of the present invention;

FIG. 4 is a schematic diagram illustrating an environment in which the processes described herein are implemented according to certain embodiments of the invention; and FIG. 5 is a flow chart illustrating an exemplary process of remotely collecting data from the local storage of a computing device, in accordance with an embodiment of the invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

As may be appreciated by one of skill in the art, the present invention may be embodied as a method, system, computer program product, or a combination of the foregoing. Accordingly, the present invention may take the form of an entirely software embodiment (including firmware, resident software, micro-code, etc.) or an embodiment combining software and hardware aspects that may generally be referred to herein as a "system." Furthermore, embodiments of the present invention may take the form of a computer program product on a computer-readable medium having computer-usable program code embodied in the medium.

Any suitable computer-readable medium may be utilized. The computer-readable medium may be, for example but not limited to, an electronic, magnetic, optical, electromagnetic, infrared, or semiconductor system, apparatus, device, or propagation medium. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device; or transmission media such as those supporting the Internet or an intranet. Note that the computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described below with reference to flowchart illustrations and/or block diagrams of methods, apparatus (systems), and computer program products. It may be understood that each block of the flowchart illustrations and/or block diagrams, and/or combinations of blocks in the flowchart illustrations and/or block diagrams, can be implemented by computer program instructions. These computer program instructions may be provided to a processor of a general purpose computer, special purpose computer, or other programmable data processing apparatus to produce a computing device, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block(s).

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

Thus, apparatus, systems, methods and computer program products are herein disclosed that provide for a local collection tool that is configured to run as an authorized background service process. As such, the local collection tool of the present invention is capable of being executed in the absence of the device user providing requisite credentials. Moreover, the authorized background service process aspect of the present invention provides for bypassing file security thereby providing access to files that even the device user may not have access to.

In addition, due to the fact that the local collector is configured to be executed without the user providing credentials, the back-up file that is generated by the collection tool may include encrypted data. Thus, according to specific embodiments of the invention the collection entity, such as a collection server or the like, is configured to automatically decrypt the encrypted data using a master key. Use of a master key eliminates the need to manually enter the user's key to provide for decryption of the encrypted data.

Referring to FIG. 1, a system 10 is shown for implementing a collection tool that runs as an authorized background service process for the local collection of local data in an electronic discovery (e-discovery) system, in accordance with an embodiment of the present invention. The system includes a deployment server 122, a collection server 132 and one or more computing devices 136.

The deployment server 122 includes a computing platform 12 having a memory 14 and a processor 16. The computing platform 12 is configured to receive and execute routines and applications, such as collection tool deployment application 18. The memory 16 may comprise volatile and non-volatile memory, such as read-only and/or random-access memory (RAM and ROM), EPROM, EEPROM, flash cards, or any memory common to computer platforms. Further, memory 14 may include one or more flash memory cells, or may be any secondary or tertiary storage device, such as magnetic media, optical media, tape, or soft or hard disk. The processor 16 may be an application-specific integrated circuit ("ASIC"), or other chipset, processor, logic circuit, or other data processing device.

The memory 14 of deployment server 122 includes collection tool deployment application 18 configured to communicate (i.e., deploy), via communication network 160, the authorized background service process collection tool 140 to one or more computing devices 136. The communication network 160 may include any wired, wireless or combination network, including, but not limited to, a wide area network (WAN), such as the Internet; a local area network; an intranet or the like. The one or more computing devices 136 to which the collection tool 140 is deployed are designated by an electronic discovery/data collection user, referred to herein as an e-discovery manager.

Further functionality of the deployment server 122 is discussed in detail in relation to FIG. 4. Examples of deployment server 122 functionality include accessing a list of computing devices marked for collection to determine deployment of collection tool and/or receiving an affirmative request to deploy the collection tool 140 to one or more specified computing devices 136. Additionally, deployment server 122 is configured to transmit confirmation of the deployment to another network entity, such as a database server 118 (shown in FIG. 4). In further embodiments, the deployment server 122 may include an IP look-up table tool 170 (shown in FIG. 4) configured to locate the one or more computing devices designated for deployment using information (other than an IP address) provided by a network entity, such as database server 118.

Computing device 136 includes a computing platform 20 having a memory 22 and a processor 24. The computing platform 20 is configured to receive and execute routines and applications, such as collection tool 140. The memory 22 may comprise volatile and non-volatile memory, such as read-only and/or random-access memory (RAM and ROM), EPROM, EEPROM, flash cards, or any memory common to computer platforms. Further, memory 22 may include one or more flash memory cells, or may be any secondary or tertiary storage device, such as magnetic media, optical media, tape, or soft or hard disk. The processor 24 may be an application-specific integrated circuit ("ASIC"), or other chipset, processor, logic circuit, or other data processing device.

The memory 22 of computing device 136 stores, at least temporarily, background service process collection tool 140. The access granted to the authorized background service process of the collection tool 140 allows the tool to be executed absent the device user providing credentials. The collection tool directs the computing device 136 to generate a backup file 26, otherwise referred to herein as a snapshot, of all data items and/or files stored in local storage 28.

The local storage 28 may additionally include encrypted data 30. Since, the collection tool 140 is run in the absence of user credentials, in those instances in which the local storage 28 includes encrypted data 30, the encrypted data 30 is included in the backup file 26. It should be noted, that data in the encrypted form is included in the backup file 26 as opposed to data in the decrypted form because decryption of the data would require the tool 140 to run under the device user's credentials.

Moreover, by having the collection tool 140 running as an authorized background service process the tool has access to data 32, which may or may not be secured data and may or may not be accessible to the device user. Thus, in turn, the data 32 may be included within the backup file 26. It should be noted that data 32 may include encrypted data 30.

Once the backup file 26 is generated, the backup file 26 is stored in a storage area 144 and a copy of the backup file 26 is communicated to a network entity, such as collection server 132. In addition, once the collection process is performed, the collection tool 140 may be removed from memory 22.

Collection Server 132 includes a computing platform 40 having a memory 42 and a processor 44. The computing platform 40 is configured to receive and execute routines and applications, such as data collection application 46. The memory 42 may comprise volatile and non-volatile memory, such as read-only and/or random-access memory (RAM and ROM), EPROM, EEPROM, flash cards, or any memory common to computer platforms. Further, memory 42 may include one or more flash memory cells, or may be any secondary or tertiary storage device, such as magnetic media, optical media, tape, or soft or hard disk. The processor 44 may be an application-specific integrated circuit ("ASIC"), or other chipset, processor, logic circuit, or other data processing device.

It should be noted that deployment server 122 and collection server 132 are shown and described as separate devices. However, in alternate embodiments of the invention, the functionalities shown and described in relation to the deployment server 122 and the collection server 132 may be included in one comprehensive computing device/server or more than two computing devices/servers.

The memory 42 of collection server 132 includes data collection application 46 configured to receive the backup file 26 as communicated from computing device 136. In specific embodiments of the invention, the backup file 26 may include encrypted data 30. In such embodiments, the data collection application 46 may further include decryption routine 48 that is configured to automatically decrypt the encrypted data 30 by application of a master key 50. Decryption by application of the master key 50 obviates the need to manually apply a user's key to the encrypted data as the means for decryption.

Further functionality of the collection server 132 is discussed in detail in relation to FIG. 4. Examples of collection server 132 functionality include depositing the backup file 26 as it is received from the computing device 136, into a landing zone 154 (shown in FIG. 4) that serves as both a temporary storage area and staging area for the incoming data, where various functions could be performed on the data. The landing zone provides for decryption in the event that the backup file 26 includes encrypted data 30. According to another embodiment of the invention, the collection server 132 also communicates with the database server 118 (shown in FIG. 4) in order to update the catalog stored in the database server. As each file in the backup file is uploaded to the collection server 132 and stored temporarily in the landing zone 154, the collection server communicates to the database server 118 that the file has been collected, and that item in the catalog is marked accordingly. On the other hand, in the event a file is not successfully transmitted to the collection server 132, the collection server 132 will communicate an error message to the database server 118 and that item in the catalog will be marked as uncollected. It should be appreciated that the status of the collection of each file could be communicated to the database server 118 by alternative mechanisms, including by the collection tool 140.

Referring to FIG. 2 a flow diagram of a method 60 for executing a local collection tool that runs as an authorized background service process, in accordance with embodiments of the present invention. At Event 62, a collection tool is executed at a computing device within an electronic discovery system. The collection tool is configured to run as an authorized background service process with authorization to be run absent the need to have the device user provide credentials. Thus, the collection tool may be executed without the presence of the device user or without the knowledge of the device user. In addition, in those embodiments in which the computing device is used by multiple users, the collection tool may be executed without the presence of any of the users or without the knowledge of any of the users. Additionally, execution of the collection tool is automatic upon deployment of the collection tool at the computing device.

At Event 64, in response to execution of the collection tool, a backup file is generated that includes data stored locally at the computing device. In those computing devices, in which the local storage includes encrypted data, the backup file includes the raw encrypted file. In other words, the encrypted data is not decrypted prior to generating the backup file and subsequently communicating the backup file to the data collection entity/collection server. This is because decryption of the data would require the device user to provide necessary credentials. In addition, the backup file captures any other secured data stored locally, which may or may not be accessible to the device user.

Once generated, the backup file; otherwise referred to herein as the snapshot, is stored locally and, at Event 66, the backup file is communicated to a data collection entity, such as a collection server or the like.

Referring to FIG. 3 a flow diagram of a method 70 for deploying a local collection tool that runs as an authorized background service process and receiving the backup file resulting from running such a collection tool, in accordance with embodiments of the present invention. At Event 72, a collection tool is communicated (i.e., deployed) to a computing device within an electronic discovery system. The collection tool is configured to run as an authorized background service process with authorization to be run absent the need to have the device user provide credentials. Thus, the collection tool may be executed without the presence of the device user or without the knowledge of the device user.

At Event 74, in response to communication of the collection tool, a backup file that includes data stored locally at the computing device is received at a collection server. Optionally, the data in the backup file may include encrypted data.

At Event 76, if the backup file includes encrypted data, the encrypted data is decrypted at the collection server by application of a master key. Decryption by application of the master key eliminated the need to manually apply the device user's key to the encrypted data.

FIG. 4 illustrates an exemplary local collection system 100 in accordance with an embodiment of the invention. The local collection environment includes a plurality of servers and computing devices in communication with one another over a communication network, as would exist, for example, in a company's information technology operating environment. In particular, a case management server 112, a database server 118, a deployment server 122, a collection server 132, a network storage device 142, and at least one client computing device 136 are all in communication over a communication network 160. The communication network 160 could be a wide area network, including the Internet, a local area network or intranet, a wireless network, etc. A collection tool 140 is also provided that is configured to be deployed over the communication network 160 to the computing device 136. The collection tool 140 is described further herein below.

The case management server 112 provides user interface management for a user interface 116. In one particular embodiment, the case management server 112 is a web server that can be accessed by a web browser. Through the case management server 112, the user interface 116 may be presented to a user for the purposes of initializing and managing the local collection process. For illustrative purposes, it will be assumed herein that the user interacting with the user interface 116 is an employee or contractor of the company who serves a case management and electronic discovery management role, and hereafter is referred to as the electronic discovery manager (i.e., "e-discovery manager"). As discussed in detail further below, the e-discovery manager can utilize the user interface 116 to identify computing devices from which data should be collected and review the progress of those selected collections. It should be appreciated, however, that any individual could use the user interface 116 to perform the manual functions herein attributed to the e-discovery manager, and, indeed, that an automated process could be generated to perform those functions as well.

The case management server 112 is in communication with the database server 118, the deployment server 122, and the collection server 132. The database server 118 is configured to provide database services for the system, including housing the queue of computing device names selected for collection by the e-discovery manager, which are provided to the database server 118 by the case management server 112. As discussed more generally below, the e-discovery manager can utilize the user interface 116 to mark a certain user and/or computing device for collection. In one embodiment of the present invention, the information input by the e-discovery manager and transmitted to the database server 118 for housing includes a user identification, an associated computing device name identifying the target computing device 136 (specifically the computing device name as such computing device is defined in its particular domain), and an indicator indicating the particular domain of the identified computing device 136. Such information could be entered in a situation where the computing devices marked for collection are subject to dynamic IP addressing, so as to provide the deployment server 122 with enough information to locate the target computing device 136. In another embodiment of the present invention, for example in situations where IP addresses remain static, the e-discovery manager could simply enter the IP address of the target computing device 136 and such IP address would be transmitted to the database server 118. The database server 118 houses the applicable information regarding the identification and/or location of the target computing device 136, however provided by the e-discovery manager, and communicates with the deployment server 122 in anticipation of deployment.

The deployment server 122 is configured to deploy the collection tool 140 over the communication network 160 to the client computing device 136, which is connected to the communication network 160. In some embodiments of the present invention, the deployment server 122 is configured to deploy the collection tool 140 to any of a certain number of computing devices that are members of a particular known domain or domains, for example, domains relating to a single company or entity. In one embodiment of the present invention, the deployment server 122 accesses the list of computing devices marked for collection in the database server 118. The deployment server 122 is configured to communicate with the database server 118 and inquire whether there are any computing devices listed in the database server 118 that are marked for collection to which the collection tool 140 has not yet been deployed. If this inquiry determines that there is a computing device marked for collection that has not yet been addressed by the deployment server 122, the deployment server will deploy the collection tool 140 to the target computing device 136. Alternatively, in other embodiments of the invention, the database server 118 may be configured to affirmatively request that the deployment server 122 deploy the collection tool 140 to a particular identified target computing device 136. In either instance, upon deployment of the collection tool 140 by the deployment server 122, the deployment server 122 transmits confirmation to the database server 118 that the collection tool 140 has been deployed. The listing of the target computing device 136 in the database server 118 is then updated to show a status of deployment in order to avoid duplicative deployments.

With regard to deployment, the collection tool 140 may be deployed to the target computing device 136 if the IP address for such target computing device 136 is known and the target computing device 136 is connected to the communication network 160. In embodiments of the invention wherein the communication network 160 is the private network of a particular entity, the target computing device 136 may be connected to the communication network 160 via a virtual private network (VPN). In the event the IP address of the target computing device 136 is provided by the database server 118 initially, the collection tool 140 can be immediately deployed. On the other hand, according to embodiments of the invention operating in an environment subject to dynamic IP addressing, the deployment server 122 will first locate the target computing device 136 using the information (other than IP address) provided by the database server 118 (and originating with the e-discovery manager). According to one embodiment, wherein the database server 118 provides the deployment server 122 with a user identification, a computing device name, and an identification of the domain of the target computing device 136, an IP address lookup tool 170 is provided that is configured to run on the deployment server 122 and scour the communication network 160 over the identified domain to identify the target computing device 136 by bouncing the given computing device name against all name resolution servers and obtaining a match. Upon identifying a computing device on the network whose name and domain matches those specified by the database server 118, the IP address lookup tool 170 communicates the IP address for such identified computing device to the deployment server 122 for deployment, either directly, or through the case management server 112. In one embodiment, the IP address lookup tool 170 is configured to access over the communication network 160 the computing device having the IP address identified and to confirm that the name of the computing device having that IP address matches the computing device name originally given to the IP address lookup tool 170 to search. In the event the IP address lookup tool 170 does not find a match, the deployment server 122 relates to the database server 118 and/or the case management server 112 that deployment failed due to inability to locate the identified computing device. According to different embodiments, the database server 118 may keep the computing device-identifying information in its queue for another deployment attempt or make an indication in its record that deployment to the computing device failed, removing that computing device from its active queue. The e-discovery manager may also be prompted via the user interface 116 to provide additional information or investigate the failed deployment.

In some embodiments, the IP address lookup tool 170 is further configured to confirm that the located computing device maintains a profile for the particular user identification provided by the database server 118. If such a profile is located, the IP address lookup tool 170 confirms that the located computing device is indeed the intended target computing device 136 and the collection tool 140 is deployed to the target computing device 136. If such a profile cannot be found on the located computing device, a message to that effect is relayed back to the case management server 112 for presentation to the e-discovery manager through the user interface 116. Furthermore, the database server 118 will maintain the identifying information about such computing device until the computing device is successfully located and the collection tool 140 is deployed, or until the e-discovery manager manually removes such computing device from the queue. It should be noted that the profile-confirming function of the IP address lookup tool 170 can be employed even where an IP address is initially provided by the database server 118, in order to confirm that the computing device having such an IP address has indeed been used by the user intended for collection.

With regard to the collection tool 140, the collection tool 140 is configured to access and be installed on any computing device to which it is deployed by the deployment server 122, and in particular, the target computing device 136. According to one embodiment, the collection tool 140 is configured to be automatically installed on the target computing device 136. Such automatic installation is advantageous as it not only avoids the need for the user to be granted administrator privileges to install a program, or other intervention by a network administrator, but also avoids the delay in collection that could occur if the user of the target computing device 136 was responsible for installation. According to some embodiments, the collection tool 140 is configured to generate a snapshot of the data residing on the local storage of the target computing device 136, store the snapshot in a storage area 144 on the target computing device 136, and transmit copies of the files contained in the snapshot to the collection server 132. By transmitting the data from the snapshot of the data stored on the hard drive of the computing device 136, the collection tool 140 advantageously allows the user to continue to use the computing device 136 without substantial interference from the collection tool 140 and even interact with the data stored on the hard drive as the snapshot of the data is being transmitted to the collection server 132. Utilizing the snapshot for collection also reduces the ability of a user to avoid the collection of certain data by deleting the data from the local storage of the computing device 136, since any deletion of files on the computing device 136 after the snapshot is taken will not affect the snapshot, and the deleted files will still be transmitted to the collection server 132 from the snapshot.

More specifically, and in accordance with some embodiments of the present invention, the collection tool 140 is configured, upon accessing and installing on the target computing device 136, to present a message to the user of the target computing device 136 indicating that the computing device has been identified for collection and requesting that the user log off and log back on to the computing device. In addition, the collection tool 140 is configured to automatically initialize when the user logs back on to the computing device 136, and then to immediately and automatically generate a snapshot of all files stored on the hard drive of the computing device 136. Generating the snapshot upon log-in, prior to the user being able to open, use, delete or otherwise interact with the files stored on the hard drive, ensures that the snapshot is not corrupted by files that are thereafter locked, opened or used by the user or otherwise. The snapshot may be generated by using a commercially available tool such as the Volume Shadow Copy Service offered through Microsoft Windows. The log off/log on procedure not only resets the collection tool 140, but also ensures that the snapshot encompasses the broadest scope of potential files available on the hard drive, ensures that the files are not locked at the time that the snapshot is taken, thus improving the likelihood of a complete collection without conflicts, and increases the usability of the computing device 136 during the collection process. Alternatively, however, the log off/log on procedure does not need to be employed by the collection tool 140, and other embodiments of the invention may provide for automatic or manual generation of the snapshot upon installation of the collection tool 140.

After generating the snapshot of the files on the hard drive of the computing device 136, the collection tool 140 is configured to store the snapshot in a storage area 144 located on the client computing device 136. It is from the storage area 144 that the entire snapshot, and the files and data contained therein, will be transmitted to the collection server 132. In addition to storing the snapshot, the collection tool 140 is also configured to transmit to the database server 118 a catalog of the files contained in the snapshot. As described in greater detail below, this catalog may be referenced by the collection server 132 in order to determine whether collection is complete. Additionally, in accordance with some embodiments, the collection tool 140 is configured to compile and transmit to the case management server 112, either directly or indirectly through other servers such as the database server 118, a list of network resources the user is using, including, for example, applications or databases on the network that the user has used or accessed. This list of resources may be presented to the e-discovery manager through the user interface 116 and can serve to guide the e-discovery manager in the identification of other data that should be collected.

According to one embodiment, the collection tool 140 may transmit this list of network resources each time it connects to the collection server 132 following an interruption in connection.

With regard to transmission of the files themselves, according to one embodiment of the invention, the collection tool 140 is configured to compress, hash, and upload the files contained in the snapshot to the collection server 132. Compressing the files prior to transmission thereof increases the rate of transmission and therefore advantageously decreases total collection time. In addition, the bandwidth required for transmission decreases when the files being transmitted are compressed, so compressing the files also advantageously improves the user experience by not degrading network performance. Hashing the files prior to transmission thereof allows a determination to be made following transmission that the data arriving at the collection server 132 is the same data that was collected from the target computing device 136 as a snapshot. It should be appreciated that one, both, or neither of the foregoing techniques may be employed by the collection tool 140 prior to transmitting the snapshot to the collection server.

In some embodiments, the collection tool 140 is also configured to determine whether a user is actively using the computing device 136 while the data (in the form of individual files in the snapshot) is being transmitted to the collection server 132. According to one embodiment, if the collection tool 140 determines that a user is not actively using the computing device 136, the collection tool 140 will allow the rate of transmission of the data to reach a maximum nearing the bandwidth capacity of the connection between the computing device 136 and the collection server 132. With regard to making such a determination, the collection tool 140 may determine that there is no active use being made of the computing device 136 by a user only after it observes a predetermined period of inactivity. On the other hand, if the collection tool 140 determines that a user is actively using the computing device 136, the collection tool 140 will slow the rate of transmission of the data to free up a sufficient amount of bandwidth so that the user may engage in other activities using the computing device 136 that require consumption of bandwidth. The determinations described may be made by the collection tool 140 continuously, so that the collection tool 140 is essentially monitoring active usage of the computing device 136 by a user, and adjusting the rate of transmission of the data as soon it is determined that a user is actively using the computing device 136 or that a user is not actively using the computing device 136. According to another embodiment, the collection tool 140 could communicate its determinations to the collection server 132 as such determinations are made, and the collection server 132 could adjust the rate at which it receives the data accordingly. Either embodiment advantageously promotes the usability of the computing device 136 to the user during the collection process, by providing the user with a greater amount of free bandwidth when the user may be pursuing unrelated activities, and makes the collection process more efficient, by increasing the rate of collection during periods when the user is not affected by a loss of bandwidth.

The collection server 132 is in communication with the target computing device 136 and is configured to receive the files transmitted by the collection tool 140 from the storage area 144 of the target computing device 136. In one embodiment, the collection server 132 deposits the files as they are received from the computing device 136, into a landing zone 154 that serves as both a temporary storage area and staging area for the incoming data, where various functions could be performed on the data. The landing zone 154 could be a network storage device, such as a file server. According to another embodiment of the invention, the collection server 132 also communicates with the database server 118 in order to update the catalog stored in the database server. As each file in the snapshot is uploaded to the collection server 132 and stored temporarily in the landing zone 154, the collection server communicates to the database server 118 that the file has been collected, and that item in the catalog is marked accordingly. On the other hand, in the event a file is not successfully transmitted to the collection server 132, the collection server 132 will communicate an error message to the database server 118 and that item in the catalog will be marked as uncollected. It should be appreciated that the status of the collection of each file could be communicated to the database server 118 by alternative mechanisms, including by the collection tool 140.

Through utilizing this cataloging method, the system operates to resume interrupted collections at the point of interruption. For example, if a particular collection is interrupted due to a loss of network connectivity between the computing device 136 and the collection server 136, either the collection tool 140 or the collection server 132, according to different embodiments of the invention, is configured to reach out to the database server 118 upon reestablishment of the connection. The catalog housed in the database server 118 can then be accessed to determine which files on the snapshot were successfully uploaded to the collection server 132 and which remain to be uploaded. At that point, the collection tool 140, either automatically if it is configured to independently determine the point of resumption, or upon the request of the collection server 132 if it is the collection server 132 that makes the determination, may resume transmission of the data from the snapshot to the collection server, transmitting only those files that are marked in the catalog housed by the database server 118 as uncollected.

The database server 118 also communicates with the collection server 132 and the collection tool 140 in completing the collection process. Once the collection tool 140 has attempted to transmit all files comprising to the collection server 132, and the corresponding status information has been communicated to the database server 118, each item in the catalog housed in the database server 118 should be marked as either successfully collected, which items correspond to those files temporarily stored in the landing zone 154, or unsuccessfully collected, which items correspond to those files that did not arrive at the collection server 132 for one reason or another.

Recalling that in some embodiments the database server 118 is in communication with the case management server 112, according to certain embodiments of the invention the case management server 112 is configured to display the status of the collection as known by the database server 118 to the e-discovery manager through the user interface 116. During collection, the catalog, or certain portions of the catalog, as well as the progress of individual file uploads and the progress of uploading the snapshot overall, may be presented to the e-discovery manager through the user interface 116. The e-discovery manager may, through the user interface, manually excuse any items in the catalog presented as unsuccessfully collected. On the other hand, the e-discovery manager may choose not to excuse an unsuccessfully collected file and instead request that the collection tool 140 attempt to collect that file again. Alternatively, and in accordance with another embodiment, the collection tool 140 will continually attempt to collect a file until it is successfully collected or manually excused. In addition, according to some embodiments, the collection server 132 is configured to recognize certain files that are not created by the user, and therefore not required to be collected. If the collection tool 140 attempts to collect a file of this type, but fails, the collection server 132 will automatically excuse the collection.

According to one embodiment, once all items in the catalog in the database server 118 are marked as either successfully collected, automatically excused, or manually excused, the collection server 132 determines that the collection is complete and transmits the data from the temporary storage of the landing zone 154 to the permanent storage of the network storage device 142. The collection server 132 may be in direct communication with the network storage device 142 and may directly transmit the data thereto, or may transmit the data to yet another intermediary server, or servers, that ultimately store the data in permanent storage in the network storage device 142. Upon determination by the collection server 132 that the collection is complete, the collection server 132, or another server in the system, may relay that message to the collection tool 140, which is configured to automatically uninstall from the computing device 136 upon receipt of such a message. According to another embodiment, the deployment server 122 may be responsible for uninstalling or deleting the collection tool 140 from the computing device 136 upon a determination by the collection server 132 that a collection is complete.

Referring now to FIG. 5, a flow chart is provided that illustrates an exemplary procedure 200 for collecting data from the local storage of a target computing device 136 via a communication network 160, in accordance with an embodiment of the invention. Pursuant to a discovery request, the e-discovery manager will be required to collect data from certain company employees' computers. The computers may be, for example, laptops or desktops, and may be connected to the communication network 160 through a local area connection, a wireless network connection, or otherwise. The e-discovery manager specifies identification information for each computer from which data is to be collected in response to the discovery request. Accordingly, as represented by block 202, the exemplary procedure 200 begins with identifying a target computing device 136 for collection. In this regard, the e-discovery manager, through the user interface 116, enters certain identification information for the target computing device 136. This identification information may include, for example, the IP address of the target computing device 136, the name of the computing device 136 as it is defined in its particular domain, the user name of the individual to whom the particular collection is targeted, and/or the domain of which the computing device 136 is a member. The identification information relating to the target computing device 136 is housed by the case management server 112 in the database server 118 for access by the deployment server 122. The configuration of computing device identifying information in the database server 118 may take the form of a queue of computing devices requiring collection.

Next, as represented by block 204, the collection tool 140 is deployed by the deployment server 122 to the target computing device 136. The deployment server 122 communicates with the database server 132 to determine if deployment to a computing device is required. According to one embodiment, if the deployment server 122 locates computing device-identifying information in the database server 118 that it has not yet addressed, either through deployment or attempted, but failed, deployment, the deployment server 122 prepares to deploy the collection tool 140 to the computing device identified. If the IP address for the target computing device 136 is provided, the deployment server 122 may immediately deploy the collection tool 140 to the computing device 136. If the IP address is not given, the IP address lookup tool 170 may be employed by the deployment server 122. As discussed above, the IP address lookup tool 170 uses information input by the e-discovery manager other than IP address to locate the target computing device 136 and obtain its IP address.

Following deployment, as represented by block 206, the collection tool 140 is installed on the target computing device 136. According to some embodiments, the collection tool 140 accesses and automatically installs on the target computing device 136, presenting a notice to the user of its presence on the computing device 136 and a request to log off and log back on to the computing device. According to one embodiment, the user may immediately oblige with the request, or may opt to defer, for example if the user is engaged in an activity using the computing device 136 at the time of the initial request. In the event the user defers, the user will be reminded after a predetermined period to log off and log back on in order to commence the collection process. Alternatively, the user may not be given the option of deferring and may not even be required to log off and log back on. In fact, in some embodiments the user is not even notified of the presence of the collection tool 140 or that a collection is taking place. Such covert collections advantageously prevent the user from intentionally interfering with the collection process.

The procedure continues as represented by block 208 by generating a snapshot of the data located in the local storage of the computing device 136. The collection tool 136 may generate this snapshot using known techniques and/or services. Additionally, the snapshot may encompass all or a portion of the files residing on the hard drive of the user's computing device 136. Next, as represented by block 210, the snapshot is stored in a storage area 144 on the computing device 136. The collection tool 140 is responsible for storing the snapshot in the storage area 146 and transmitting to the database server 118 a catalog of the files included in the snapshot. The transmission of the catalog could occur prior to, concurrent with, or directly following storage of the snapshot in the storage area 144. According to some embodiments of the present invention, a security tool may be employed to prevent the user from accessing the storage area 144 or otherwise accessing or editing the snapshot.

As represented by block 212, the snapshot is transmitted to the collection server 132. According to some embodiments, the collection tool may upload the snapshot, and the files comprising the snapshot, to the collection server 132. Prior to or during transmission, the files may be compressed and/or hashed. As described above, and in some embodiments, the rate of transmission of files is slowed when it is determined that a user is actively using the computing device 136 and increased when, based on a period of inactivity, it is determined that a user is not actively using the computing device. In addition, as the files are uploaded from the storage area 144 to the collection server 132, the progress of transmission may be observed and related to the database server 118, and ultimately, to the user interface 116, by either the collection tool 140 or the collection server 132. Therefore, the catalog in the database server 118 is continually updated to show which files have been successfully collected, which files encountered problems during collection (and were perhaps manually excused by the e-discovery manager), and which files remain to be collected. This cataloging technique advantageously allows collection to resume from the point of interruption in the event the user or an outside force disrupts the transmission of files and, furthermore, avoids the inefficiencies of over-collection and under-collection that plague currently known systems. For example, such embodiments of the invention allow a user of a laptop or other mobile terminal to disconnect from the network when needed even if a collection is in progress. When the user laptop reconnects to the network 160, the collection resumes where it left off. In accordance with embodiments of the invention where the collection tool 140 operates within the computing device 136 covertly, encrypted files on the computing device 136 can be transmitted to the collection server 132 and decrypted with a master key by the collection server 132. This would advantageously automate decryption of files and obviate the need for the e-discovery manager to have access to the master key.

The collection procedure continues as represented by block 214 with storing the collected data in the landing zone 154. The collection server 132, upon receipt of the files from the computing device 136 as transmitted by the collection tool 140, stores the files in the landing zone 154 and awaits a final determination that collection is complete. Through communication between the collection server and the database server 118, it is determined that collection is complete when each item in the catalog of the database server 118 has been successfully collected or manually excused by the e-discovery manager. Alternatively, it may be provided, either by the e-discovery manager or an administrator of the system, that a different status of an item in the catalog is not an impediment to a determination that collection is complete, and in that case, it could be determined that collection is complete even though not every file was collected or excused.

When the collection server 132 either makes the determination that collection is complete, or receives notification that collection is complete, in accordance with different embodiments of the present invention, the data in the landing zone 154 is finally stored in the network storage device 142, as set forth in block 216. The collection server 132 transmits the data from the temporary storage area of the landing zone 154 to the permanent storage area of the network storage device 142. This signals the end of the collection process, and as represented by block 218 and in accordance with some embodiments, the collection tool 140 is finally uninstalled from the computing device 136. Alternatively, and in accordance with some embodiments of the invention, transfer of data to the permanent storage area of the network storage device 142 is not required and the collection tool 140 may be uninstalled from the computing device 136 upon confirmation that all files have either been successfully collected or excused by the e-discovery manager.

It should be understood that when two devices are described herein as communicating over a network, the devices may be directly coupled to each other or directly coupled via one or more other network devices. Furthermore, although numerous servers are described above, said servers need not be separate devices and may, in some embodiments, be combined into one or more devices that perform the functions of multiple servers. It should also be appreciated that, in some embodiments, the servers are all maintained by the company whose employees and client computing devices are subject to the electronic discovery request, while in other embodiments, a second separate company may perform the electronic discovery process described herein for the first company. For example, in one embodiment, the network storage device 142 and the employee computing device 136 are owned or monitored by a first company and the case management server 112, database server 118, deployment server 122, and collection server 132 are owned or monitored by a second company that provides an e-discovery management service for the first company.

Thus, present embodiments herein disclosed provide for improvements in electronic discovery. Specifically, present embodiments provide for a local collection tool that is configured to run as an authorized background service process. As such, the local collection tool of the present invention is capable of being executed in the absence of the device user's credentials. Thus, the collection process can be accomplished absent the device user or covertly without the knowledge of the device user. This facet allows for collection of data to occur if the device user has been terminated, resigned or is otherwise unavailable and for investigative type collection to be performed without the knowledge of the device user.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other updates, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A method for collecting data locally stored in an electronic discovery system, the method comprising:
  deploying, via a computing device processor, a collection tool at a first computing device within the electronic discovery system;
  executing, via a computing device processor, the collection tool at the first computing device, wherein the collection tool is configured to run as an authorized background service process, and wherein the collection tool is configured to automatically be executed in response to deployment of the collection tool at the first computing device;
  generating, via the computing device processor, in response to execution of the collection tool, a backup file that includes files stored locally at the first computing device and a catalog of the files included in the backup file;
  communicating, from the first computing device to a network device, the catalog;
  sequentially uploading, via the computing device processor, each of the files in the backup file to a collection server, wherein a rate of transmission of the uploading is varied based on a determination as to whether a user is actively using the first computing device; and
  communicating, from the collection server to the network device, an indication each time one of the files has been successfully uploaded, wherein receipt of the indication by the network device provides for a mark to be made in the catalog indicating that the file has been successfully collected.

2. The method of claim 1, wherein executing further comprises executing, via the computing device processor, the collection tool configured to run absent computer device-user credentials.

3. The method of claim 1, wherein executing further comprises executing, via the computing device processor, the collection tool configured with data access security authorization for collection of data.

4. The method of claim 1, wherein generating further comprises generating a backup file that includes encrypted files stored locally at the first computing device.

5. The method of claim 4, further comprising, decrypting, via a computing device processor, the encrypted files at the collection server once the files have been successfully uploaded.

6. The method of claim 5, wherein decrypting further comprises decrypting the encrypted files at the collection server by automated application of a master key.

7. An apparatus configured for electronic discovery collection of data stored locally, the apparatus comprising:
  a computing platform including a memory and a processor; and
  a collection tool stored in the memory, executable by the processor as an authorized background service process and configured to:
  deploy at a first computing device;
  direct the computing platform to automatically execute in response to deployment of the collection tool at the first computing device, wherein the collection tool is configured to execute as an authorized background service process;
  direct the computing platform to generate a backup file that includes files stored locally at the first computing device and a catalog of the files included in the backup file;
  direct the computing platform to communicate the catalog to a network device;
  direct the computing platform to sequentially upload each of the files in the backup file to a collection server, wherein a rate of transmission of the upload is varied based on a determination as to whether a user is actively using the first computing device,
  wherein each time one of the files has been successfully uploaded at the collection server an indication is communicated to the network device that prompts a mark to be made in the catalog indicating that the file has been successfully collected.

8. The apparatus of claim 7, wherein the collection tool is further configured and authorized to be automatically executable by the processor absent computer device-user credentials.

9. The apparatus of claim 7, wherein the collection tool is further configured to direct the computing platform to generate the backup file of files using data access security authorization.

10. The apparatus of claim 7, wherein the collection tool is further configured to generate a backup file that includes encrypted files stored locally at the first computing device.

11. The apparatus of claim 10, wherein the collection tool is further configured to sequentially upload the files to the collection server, wherein decryption of the encrypted files occurs at the collection server.

12. The apparatus of claim 11, wherein the collection tool is further configured to sequentially upload each of the files to the collection server, wherein decryption of the encrypted file occurs at the collection server by automated application of a master key.

13. A computer program product comprising:
  a non-transitory computer-readable medium comprising:
  a first set of codes for causing a computer to deploy a collection tool at a first computing device;
  a second set of codes for causing a computer to execute the collection tool, wherein the collection tool is configured to run as an authorized background service process, and wherein the collection tool is configured to automatically execute in response to deployment of the collection tool at the first computing device;

a third set of codes for causing a computer to generate, in response to execution of the collection tool, a backup file that includes files stored locally and a catalog of the files included in the backup file;

a fourth set of codes for causing a computer to communicate the catalog to a network device;

a fifth set of codes for causing a computer to sequentially uploading, via the computing device processor, each of the files in the backup file to a collection server, wherein a rate of transmission of the uploading is varied based on a determination as to whether a user is actively using the first computing device; and a sixth set of codes for causing a computer to communication indication each time one of the files has been successfully uploaded, wherein receipt of the indication by the network device provides for a mark to be made in the catalog indicating that the file has been successfully collected.

14. The computer program product of claim 13, wherein the second set of codes is further configured and authorized to execute the collection tool absent computer device-user credentials.

15. The computer program product of claim 13, wherein the second third set of codes is further configured to cause the computer to execute the collection tool using data access security authorization.

16. The computer program product of claim 13, wherein the third set of codes is further configured to cause the computer to generate the backup file that includes encrypted files stored locally.

17. The computer program product of claim 16, wherein the fifth set of codes is further configured to cause the computer to sequentially upload each of the files in the backup file to the collection server, wherein decryption of the encrypted files within the backup files occurs at the collection server.

18. The computer program product of claim 17, wherein the fifth set of codes is further configured to cause the computer to sequentially upload each of the files in the backup file to the collection server, wherein decryption of the encrypted files within the backup file occurs at the collection server by automated application of a master key.

* * * * *